US005711984A

United States Patent [19]

Woodward et al.

[11] Patent Number: 5,711,984
[45] Date of Patent: Jan. 27, 1998

[54] TREATMENT OF AN EDIBLE PRODUCT WITH HUMECTANTS

[75] Inventors: Susan Isabel Woodward, Winmallee; Theresa May Len Wong, Kings Langley, both of Australia

[73] Assignee: Gazelle Foods Pty, Ltd., Pendle Hill, Australia

[21] Appl. No.: 569,231

[22] PCT Filed: Jul. 15, 1994

[86] PCT No.: PCT/AU94/00400

§ 371 Date: Jan. 11, 1996

§ 102(e) Date: Jan. 11, 1996

[87] PCT Pub. No.: WO95/02335

PCT Pub. Date: Jan. 26, 1995

[30] Foreign Application Priority Data

Jul. 15, 1993 [AU] Australia .................................. PL9972

[51] Int. Cl.⁶ .................. A23L 1/212; A23L 1/09; A23B 7/08; A23B 7/14
[52] U.S. Cl. .................. 426/640; 426/331; 426/102; 426/103; 426/281; 426/321; 426/615; 426/620
[58] Field of Search .................................. 426/640, 331, 426/102, 103, 281, 321, 615, 620

[56] References Cited

U.S. PATENT DOCUMENTS

| 3,952,112 | 4/1976 | Fulger et al. | 426/321 |
|---|---|---|---|
| 4,256,772 | 3/1981 | Shanbhag et al. | 426/331 |
| 5,000,971 | 3/1991 | Hsieh | 426/302 |
| 5,084,296 | 1/1992 | Lugay et al. | 426/573 |

*Primary Examiner*—David L. Lacey
*Assistant Examiner*—Choon P. Koh
*Attorney, Agent, or Firm*—Jack C. Munro

[57] ABSTRACT

A method of reducing an equilibrium relative humidity level in an edible product comprising:

applying a solution, incorporating a first humectant in a liquid form to the product whereby at least a part of the first humectant is absorbed into the edible product;

applying a second humectant in a solid form to the product so as the second humectant absorbs residual moisture and is itself absorbed into the product; and wherein both the first and second humectants are effective in reducing the equilibrium relative humidity of the product to a predetermined level.

10 Claims, No Drawings

TREATMENT OF AN EDIBLE PRODUCT WITH HUMECTANTS

This invention relates to treatment of an edible product and in particular to the lowering of the equilibrium relative humidity of a dried edible product such as fruit whilst retaining some degree of aesthetically pleasing appearance, texture and/or flavour.

Edible products such as dried fruit, in particular sultanas, currants, or raisins, are frequently incorporated into breakfast products, such as muesli, which contain cereal or cereal products such as bran or oats. Sultanas when dried so as to still have a plump, juicy appearance usually have an equilibrium relative humidity (E.R.H.) of about 60%. The E.R.H. of cereal or bran is usually much lower than this; typically 25–30%. When sultanas are mixed with such cereal products and stored, as occurs with mass produced breakfast products, in a relatively airtight enclosure, the cereal product absorbs water from the sultanas as the E.R.H. values of all the ingredients tend to wards equilibrium. Consequently the sultanas become shrivelled, hard and less pleasing to the consumer.

It is known that by infusing a humectant into the dried fruit which lowers the E.R.H. value, the tendency for the fruit to dry out further is reduced. One known process of adding a humectant to a fruit comprises covering the fruit in a liquid humectant and leaving the fruit to stand while the humectant is gradually absorbed into the fruit. However, such a process can in some instances take up to a couple of weeks before a suitable E.R.H. is reached.

The present invention aims to provide an alternative method of reducing the E.R.H. value of an edible product, and in one broad form the invention comprises the following steps:

applying a solution, incorporating a first humectant in a liquid form, to the product whereby at least a part of the first humectant is absorbed into the edible product;

applying a second humectant, in a solid form, to the product so that the second humectant absorbs residual moisture and is itself absorbed into the product;

wherein both the first and second humectants are effective in reducing the equilibrium relative humidity to a predetermined level.

The two-fold effect of the solid humectant absorbing excess moisture left on or in the edible product whilst increasing the humectant levels in the product results in the equilibrium relative humidity being reduced to the predetermined level at a greater rate than with application of the solution alone.

The solution preferably includes water, since it has been found that including water in the solution increases the rate of absorption of the first humectant into the product.

Preferably, the solution is applied to the product in a first tumbling operation, whereby to maximise the absorption of the first humectant.

Preferably, the solid humectant is in the form of a powder that is preferably applied to the product prior to or during a second tumbling operation.

Preferably, the edible product comprises a fruit or vegetable and the method includes a step of softening a cuticle of the fruit or vegetable by washing the fruit or vegetable in water prior to application of the solution. The water is preferably at a temperature between 5° C. and 40° C.

Preferably the liquid humectant comprises one or more compounds selected from glycerine, or other polyhydric alcohols and sugars.

Preferably the solution is a glycerine/water mixture that comprises 75% to 85% glycerine by volume and preferably is applied to the fruit in the amount of 10–50 ml per kilogram of fruit.

Preferably the solid humectant composition comprises one or more compounds selected from the group comprising polyhydric alcohols and sugars. In any event, the selection of the first and second humectants should be such that the relative absorption properties result in the humectants being subjected to osmotic pressure toward the interior of the product.

The invention will now be described with reference to a non-limiting embodiment and examples.

Dried fruit and vegetables, whether it be sultanas, raisins, prunes, apricots or other fruit tends to stick together. Accordingly prior to packaging the fruit is sprayed with a food grade edible oil which reduces the sticking together of the fruit.

The initial stage of the preferred process is to wash the oil from the fruit and simultaneously soften the fruit's cuticle. However, if the fruit is oil free this washing step is still preferred for the purpose of softening the cuticle, but not essential. Accordingly the fruit is passed through a conventional washing plant which washes/delumps the fruit. The fruit is processed at the rate of about 1500 kg per hour and is vigorously agitated while in contact with room temperature water.

The washed fruit is then passed into a tumbler where it is sprayed with a 75–85% by volume glycerine, 25–15% water mixture at the rate of 10–50 ml per kilogram of washed fruit. The tumbler is of a continuous flow type and the fruit has a residence time of about 5 to 20 seconds within the tumbler.

The fruit exits the tumbler and is transported by an auger to a dusting station. The auger agitates the fruit during transportation and thus promotes absorption of a substantial amount of the humectant mixture. However this stage is not essential since the humectant is basically absorbed on contact with the fruit. The residence time is within the range of 3 to 5 minutes but greater or lesser residence times are acceptable depending on the humectant composition used.

The fruit is transported to the dusting station where a dusting of about 15 g per kilogram fruit of a sugar such as dextrose or a polyhydric alcohol such as sorbitol, is applied in a second tumbler. As an alternative the fruit may be dusted and then tumbled in an auger rather than a tumbler per se. Preferably if an auger is used it will have bars running parallel to its axis to promote tumbling of the fruit. On discharge from the second tumbler the fruit has a reduced E.R.H. whilst substantially retaining its pre-process appearance and texture. Typically the reduction of E.R.H. is about 4%.

The following is an example of the process.

EXAMPLE 1

Dried Australian sultanas were obtained having an E.R.H. of 60%. The sultanas were washed/delumped in a conventional washing plant using water at 20°–25° C. at the rate of 2500 kg/hour. The residence time of the sultanas in the water was about 30 seconds.

The washed and drained sultanas were supplied to a tumbler and a glycerine/water mixture at 25°–25° C. having 85% glycerine by volume applied by a spray bar at a rate of 30 ml/kg sultanas (24 g glycerine/kg sultanas). The residence time of the sultanas in the tumbler was 10 seconds.

The sultanas were then transported by an auger to a dusting station where a dusting of dextrose monohydrate was applied at a rate of 15 g of dextrose monohydrate per kilogram sultanas. The residence time of the sultanas in the auger was 3 minutes and in the tumbler 10 seconds.

After about 48 hours, sultanas so processed had an E.R.H. of 57% and were substantially comparable in appearance/touch to the unprocessed sultanas.

Whilst the invention has been described with reference to the use of a glycerine/water mixture, it will be appreciated that any appropriate humectant or mixtures of humectants may be used. For example a glycerine/sorbitol/water mixture may be used. Similarly the dusting stage may utilise other sugars or alcohols other than sorbitol or dextrose. Further the temperatures at the various stages or of the compounds used are not essential to the working of the invention.

From the above description it will be appreciated that the method of the present invention allows for a considerable amount of sultanas or raisins having a commercially useful E.R.H. to be produced in a relatively short time and as such the present invention has a substantial economic advantage over the first described known process.

It will also be appreciated that the process is not limited to sultanas or raisins and may be used on any fruit, vegetables or any other edible product, whether dried or fresh.

It will be apparent that many modifications and variations may be made by those skilled in the art to the embodiments described herein without departing from the spirit or scope of the invention.

We claim:

1. A method of reducing an equilibrium relative humidity level in an edible product comprising:

applying a solution, incorporating a first humectant in a liquid form, to said product which results in a part of the first humectant being absorbed into said product;

applying a second humectant, in a solid form, to said product with said second humectant absorbing residual moisture and with said second humectant being absorbed into said product; and wherein both said first humectant and said second humectant are effective in reducing the equilibrium relative humidity of said product to a predetermined level.

2. A method as claimed in claim 1, wherein the solution is applied to the product in a first tumbling operation, whereby to maximise the absorption of the first humectant.

3. A method as claimed in claim 1 or 2, wherein the second humectant is applied to the product prior to or during a second tumbling operation.

4. A method as claimed in claim 1, wherein the solution contains water.

5. A method as claimed in claim 1, further including a step of softening a cuticle of the edible product by washing the product in water prior to application of the solution.

6. A method as claimed in claim 5, wherein the water is at a temperature between 5° C. and 40° C.

7. A method as claimed in claim 1, wherein the first humectant comprises one or more compounds selected from the group consisting of polyhydric alcohols and sugars.

8. A method as claimed in claim 7, wherein the solution is a glycerine/water mixture that comprises 75% to 85% glycerine.

9. A method as claimed in claim 1, wherein the second humectant comprises one or more compounds selected from the group consisting of polyhydric alcohols and sugars.

10. A method as claimed in claim 1, wherein the edible product comprises a fruit or vegetable.

* * * * *